United States Patent
Mix et al.

(10) Patent No.: US 11,733,066 B2
(45) Date of Patent: Aug. 22, 2023

(54) ASSEMBLY HAVING A ROTARY ENCODER AND A TOLERANCE RING

(71) Applicant: DR. JOHANNES HEIDENHAIN GmbH, Traunreut (DE)

(72) Inventors: Stephan Mix, Marquartstein (DE); Sebastian Riepertinger, Soechtenau (DE); Thomas Jaeger, Surtal (DE)

(73) Assignee: DR. JOHANNES HEIDENHAIN GMBH, Traunreut (DE)

(*) Notice: Subject to any disclaimer, the term of this patent is extended or adjusted under 35 U.S.C. 154(b) by 0 days.

(21) Appl. No.: 17/720,304

(22) Filed: Apr. 14, 2022

(65) Prior Publication Data

US 2022/0357183 A1   Nov. 10, 2022

(30) Foreign Application Priority Data

May 6, 2021   (EP) .................................. 21172372

(51) Int. Cl.
*G01D 5/20*   (2006.01)

(52) U.S. Cl.
CPC .................................... *G01D 5/20* (2013.01)

(58) Field of Classification Search
CPC ..... G01D 5/20; G01D 5/24442; G01D 11/245
See application file for complete search history.

(56) References Cited

U.S. PATENT DOCUMENTS

| | | | | |
|---|---|---|---|---|
| 2002/0109939 | A1* | 8/2002 | Schwandt | G11B 17/038 360/99.12 |
| 2007/0034787 | A1* | 2/2007 | Mutschler | G01D 11/00 250/231.13 |
| 2008/0054765 | A1* | 3/2008 | Siraky | G01D 5/34707 310/68 B |
| 2009/0027043 | A1* | 1/2009 | Pelak | G01D 5/145 324/207.2 |
| 2019/0028001 | A1* | 1/2019 | Forthaus | H02K 11/215 |
| 2021/0247217 | A1* | 8/2021 | Flaig | G01D 11/02 |
| 2022/0355777 | A1* | 11/2022 | Joerg | H02K 11/0141 |

FOREIGN PATENT DOCUMENTS

| | | | |
|---|---|---|---|
| JP | 2017155816 A | 9/2017 | |
| WO | WO-2017093738 A1 * | 6/2017 | G01D 11/245 |

* cited by examiner

*Primary Examiner* — Akm Zakaria
(74) *Attorney, Agent, or Firm* — Leydig, Voit & Mayer Ltd.

(57) ABSTRACT

An assembly includes a rotary encoder having a shaft rotatable about an axis relative to a housing, a tolerance ring and a body accommodating the rotary encoder and the tolerance ring. The housing includes an outer wall having first and second distances from the axis in first and second sections, respectively, the first distance being greater than the second distance. The body has an opening that is: bounded radially by a first inner wall having third and fourth distances from the axis in third and fourth sections, the fourth distance being greater than the third distance; and bounded by a second inner wall which forms an axial stop for the housing. The tolerance ring surrounds the housing and is positioned within the opening such that it is disposed radially between the first and fourth sections and between the second and third sections, and is radially clamped.

9 Claims, 3 Drawing Sheets

ASSEMBLY HAVING A ROTARY ENCODER AND A TOLERANCE RING

CROSS REFERENCE TO RELATED APPLICATION

This application claims benefit to European Patent Application No. EP 21172372.1, filed on May 6, 2021, which is hereby incorporated by reference herein.

FIELD

The invention relates to an assembly having a rotary encoder and a tolerance ring as well as a body accommodating the rotary encoder and the tolerance ring.

Rotary encoders are used, for example, to determine the angular position or the rotational speed of two relatively rotatable machines parts.

In inductive rotary encoders, it is common that excitation traces and receiver tracks in the form of conductive traces are applied to a common, generally multilayer circuit board that is fixedly attached to, for example, a stator of a rotary encoder. Located opposite this circuit board is a scale element which has graduation structures formed thereon and is non-rotatably connected to the rotor of the rotary encoder. When an electrical excitation current that varies over time is applied to the excitation coils, signals which are dependent on the angular position are generated in the receiver coils during relative rotation between the rotor and the stator. These signals are then further processed in evaluation electronics.

In rotary encoders that operate in accordance with an optical principle, it is common that a light beam is modulated by a rotatable disk having graduation structures. The modulated light is then received by a photodetector. The received light intensity contains the information regarding the relative angular position.

Such rotary encoders are often used as measuring devices for electric drives to determine the relative movement or the relative position of corresponding machine parts. In this case, the generated angular position values are supplied via a suitable interface arrangement to electronics for controlling the drives.

BACKGROUND

US 2009/0027043 A1 describes a rotary encoder that can be mounted to another body with the aid of a tolerance ring.

Such an assembly has the disadvantage that during operation, conditions can occur which impair the measurement quality or the measurement accuracy of the rotary encoder.

SUMMARY

In an embodiment, the present invention provides an assembly comprising a rotary encoder, a tolerance ring and a body accommodating the rotary encoder and the tolerance ring. The rotary encoder comprises a shaft to which a scale element is non-rotatably fixed, and a housing accommodating a scanning unit which is non-rotatably connected to the housing. The shaft is disposed such that it is rotatable relative to the housing about an axis. The scale element is scannable by the scanning unit. The housing has an outer wall which has a first distance from the axis in a first section, and has a second distance from the axis in a second section, the first distance being greater than the second distance. The body has an opening that is: bounded radially with respect to the axis by a first inner wall, the first inner wall having a third distance from the axis in a third section, and having a fourth distance from the axis in a fourth section, the fourth distance being greater than the third distance; and bounded by a second inner wall which forms an axial stop for the housing with respect to the axis, the fourth section being disposed in an axial direction between the second inner wall and the third section. The tolerance ring surrounds the housing and is positioned within the opening such that it is disposed radially between the first section and the fourth section and between the second section and the third section, and is radially clamped.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
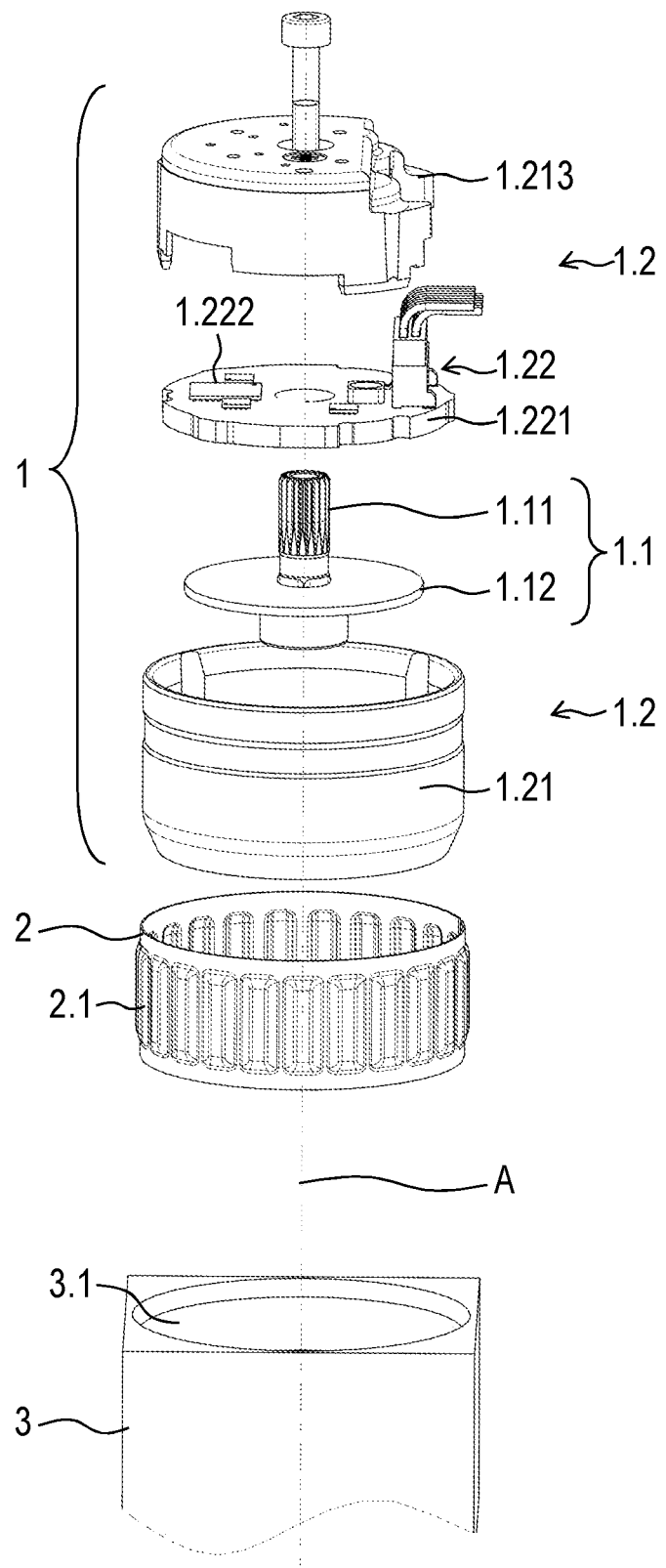
FIG. 1 is an exploded view of an assembly.

In an embodiment, the present invention provides an assembly that enables the rotary encoder to operate reliably and with high measurement accuracy over the long term.

According to an embodiment, the inventive assembly includes a rotary encoder, a tolerance ring, and a body accommodating the rotary encoder and the tolerance ring. The rotary encoder has a shaft to which a scale element is non-rotatably fixed. Furthermore, the rotary encoder has a housing accommodating a scanning unit which is non-rotatably connected to the housing. The shaft is disposed such that it is rotatable relative to the housing about an axis. The scale element is scannable by the scanning unit. The housing further has an outer wall which preferably extends continuously around the circumference thereof and which has a first radial distance from the axis in a first section. In a second section, the outer wall has a second radial distance from the axis. In this context, it holds that the first distance is greater than the second distance. Moreover, the body has an opening in which the rotary encoder and the tolerance ring are received. The opening is bounded radially with respect to the axis by a first inner wall which has a third radial distance from the axis in a third section. Moreover, in a fourth section, the first inner wall has a fourth radial distance from the axis. The body is configured such that the fourth distance is greater than the third distance. Furthermore, the opening is bounded by a second inner wall which forms an axial stop for the housing with respect to the axis, the fourth section being disposed in the axial direction between the second inner wall and the third section. Thus, the fourth section is closer to the second inner wall than the third section with respect to the axial direction. The tolerance ring surrounds the housing and is so positioned within the opening that it is disposed radially between the first section and the fourth section. Also, when the assembly is in the assembled state, the tolerance ring is disposed between the second section and the third section, with the tolerance ring being clamped radially between the housing and the body.

The first, second, third and fourth sections each extend in the axial direction. The first section and/or the second section may be areas on a convex lateral surface of a cylindrical outer contour of the housing, while the third section and/or the fourth section may be areas on a concave lateral surface of a cylindrical inner contour of the opening. However, the sections in question do not necessarily have to be continuous circumferential surfaces. Rather, these surfaces may also be interrupted, especially along the length of the circumference.

Thus, the second inner wall is oriented such that a normal vector to the inner wall has a directional component parallel to the axis.

In an embodiment of the invention, it is advantageously provided that the assembly is configured such that the second inner wall forms an axial stop for the tolerance ring.

In an embodiment of the invention, the housing has a first conical surface between the first section and the second section.

In an embodiment of the invention, it is advantageously provided that the first inner wall has a second conical surface between the third section and the fourth section.

In an embodiment of the invention, the conical surfaces are inclined relative to the axis. They may be continuous circumferential surfaces or may be interrupted along the length of the circumference In an embodiment of the invention, it is advantageously provided that the housing has a circumferential outer wall.

In an embodiment of the invention, the first inner wall has a circumferential inner contour.

A fundamental distinction is made between rotary encoders with integral bearings and rotary encoders without integral bearings, hereinafter referred to as bearingless rotary encoders. Rotary encoders with integral bearings typically have relatively small rolling-element bearings, so that the relatively rotatable component groups are disposed in a defined axial and radial position relative to each other within the respective rotary encoder. In contrast, in the case of bearingless rotary encoders, care must be taken to ensure that the relatively rotatable component groups are fixed in the correct position, in particular at the correct axial distance relative to one another, while being mounted on a machine, and that this position remains unchanged during the operation of the rotary encoder. An embodiment of the invention is advantageous especially in connection with a bearingless rotary encoder.

Other details and advantages of embodiments of the rotary encoder according to the invention will be apparent from the following description of an exemplary embodiment, taken in conjunction with the accompanying drawings.

According to FIG. 1, an embodiment of the invention relates to an assembly including a rotary encoder 1, a tolerance ring 2, and a body 3, for example a motor housing of an electric drive.

The rotary encoder 1 includes a first component group 1.1 and a second component group 1.2. Component groups 1.1, 1.2 are rotatable relative to each other about an axis A. Often, first component group 1.1 serves as rotor and second component 1.2 as a stator.

First component group 1.1 includes a shaft 1.11 or a rotary encoder shaft. A scale element 1.12 or a scale is non-rotatably fixed to shaft 1.11 of rotary encoder 1. Scale element 1.12 includes a graduation. In the exemplary embodiment presented here, scale element 1.12 is configured as an annular disk which is made of circuit board material and has a graduation provided on the annular end face thereof. Scale element 1.12 is composed of a substrate which in the exemplary embodiment shown is made of epoxy resin and on which a graduation track or a plurality of graduation tracks is/are disposed annularly and centered with respect to axis A. A graduation track typically includes a periodic sequence of alternating electrically conductive graduation regions and non-conductive graduation regions.

The housing 1.21 forming part of second component group 1.2 includes a cover 1.213 and serves to protect the interior of rotary encoder 1 from environmental influences. Housing 1.21 has disposed therein a scanning unit 1.22 which is non-rotatably fixed relative to housing 1.21 and intended for sensing an angular position between scanning unit 1.22 and scale element 1.12. In the exemplary embodiment presented here, the rotary encoder is based on an inductive scanning principle. Scanning unit 1.22 includes a multilayer circuit board 1.221. Two of the layers are patterned so as to serve as receiver traces and excitation traces. Furthermore, electronic components 1.222 are mounted on circuit board 1.221. An electronic circuit is required for operating the excitation traces and for processing the signals received by the receiver traces. Electronic components 1.222 are part of this circuit, which is used to power the excitation traces and to process the received signals. Also mounted on circuit board 1.221 is an electrical coupling piece for creating a plug-and-socket connection with a mating connector of a cable.

In the exemplary embodiment presented here, rotary encoder 1 is configured as a bearingless rotary encoder, which means that no bearing, in particular no rolling-element bearing, is disposed between first component group 1.1 and second component group 1.2. Therefore, first component group 1.1 is displaceable relative to second component group 1.2 within certain limits, especially in the axial direction.

Figure 2:
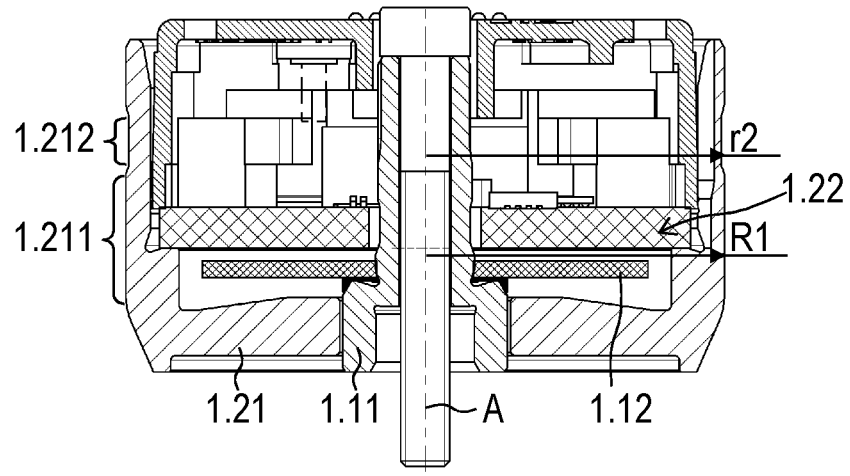
FIG. 2 is a cross-sectional view of a rotary encoder.

According to FIG. 2, housing 1.21 has a convex outer wall which has a first radial distance R1 from axis A in a first section 1.211. In the exemplary embodiment presented here, first section 1.211 is configured as a cylindrical lateral surface. First distance R1 can be regarded as the distance between a point on the aforesaid lateral surface and axis A.

In other words, the outer diameter of housing 1.21 in first section 1.211 is twice the first distance R1 (2×R1).

The outer wall of housing 1.21 has a second section 1.212 axially offset from first section 1.211. In second section 1.212, which can also be regarded as a cylindrical lateral surface, the outer wall of housing 1.21 has a second radial distance r2 from axis A. Since in the second section 1.212, the outer diameter of housing 1.21 is reduced as compared to the outer diameter of housing 1.21 in first section 1.211, it holds that first distance R1 is greater than second distance r2.

Furthermore, the assembly according to FIG. 1 includes a tolerance ring 2, which is placed around housing 1.21. As is usual, tolerance ring 2 has corrugations 2.1 stamped into it. When tolerance ring 2 is properly mounted, its corrugations 2.1 act as radially compressed compression springs.

Figure 3:
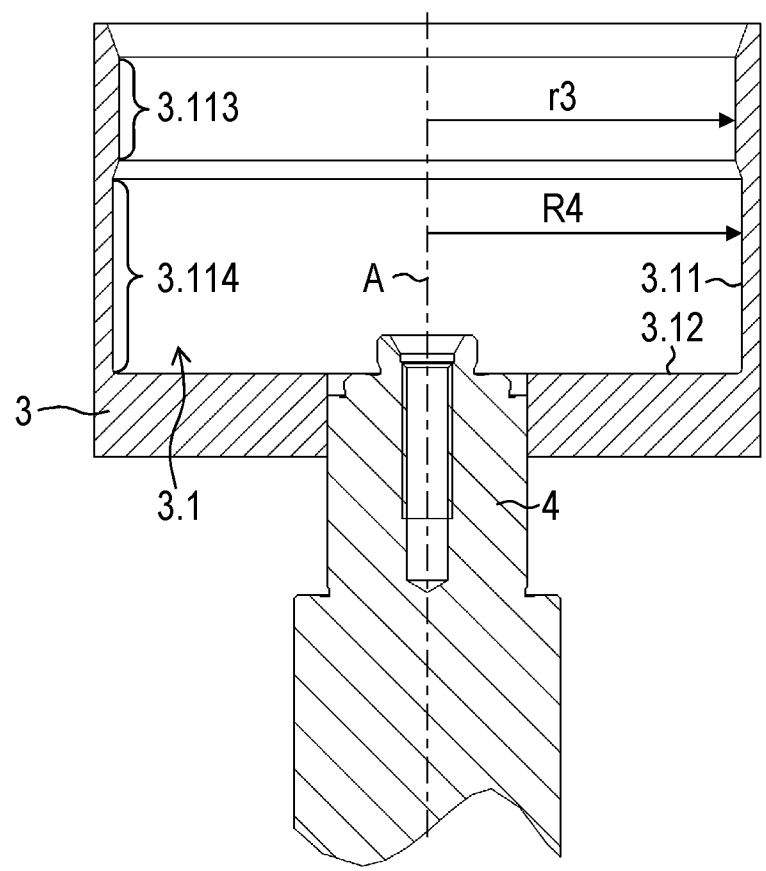
FIG. 3 is a cross-sectional view through a body which here serves as a motor housing.

Finally, the assembly includes body 3, which here is a motor housing, as mentioned above. Body 3 has an opening 3.1, which may also be referred to as a bore having an undercut. According to FIG. 3, opening 3.1 is radially bounded by a circumferential first inner wall 3.11. This first inner wall 3.11 has a third radial distance r3 from axis A in a third section 3.113, and a fourth radial distance R4 from axis A in a fourth section 3.114. Fourth distance R4 is greater than third distance r3.

Furthermore, opening 3.1 is bounded by a second inner wall 3.12. Second inner wall 3.12 is oriented in space such that a normal vector to the surface of inner wall 3.12 is parallel to axis A. In the exemplary embodiment presented here, second inner wall 3.12 is flat. Body 3 is configured such that fourth section 3.114 disposed in the axial direction between second inner wall 3.12 and third section 3.113. In addition, second inner wall 3.12 has a central bore in which a motor shaft 4 can be received. This bore is oversized relative to motor shaft 4, so that motor shaft 4 can freely rotate in the bore.

Figure 4:
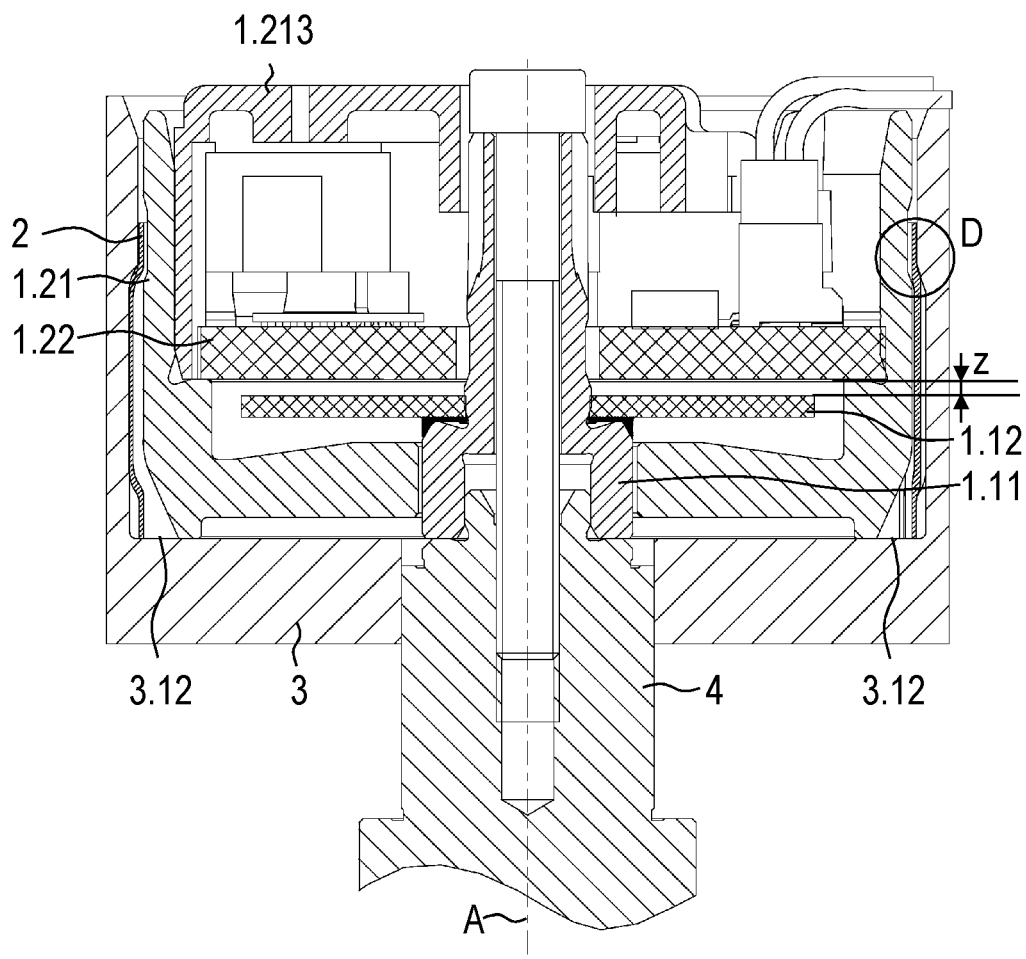
FIG. 4 is a cross-sectional view of the assembly.

In the course of mounting the rotary encoder 1 in body 3 or in the motor housing, rotary encoder 1 is pressed along with tolerance ring 2 into opening 3.1 of body 3. In this connection, second inner wall 3.12 forms an axial stop for housing 1.21 and for tolerance ring 2 with respect to axis A (FIG. 4). Housing 1.21 of rotary encoder 1 is then firmly fixed and centered by a press fit in body 3 with the aid of tolerance ring 2.

Finally, as illustrated in FIG. 4, first component group 1.1 of rotary encoder 1, in particular shaft 1.11, can be screwed to motor shaft 4, with first component group 1.1 being pressed by a central screw against a shoulder of motor shaft 4.

Because shaft 1.11 of rotary encoder 1 abuts motor shaft 4, and housing 1.21 abuts second inner wall 3.12, first component group 1.1 is accurately positioned relative to second component group 1.2 in the axial direction. Thus, once assembly is complete, the so-called scanning distance z between scale element 1.12 and scanning unit 1.22 is accurately set.

When there is relative rotation between scale element 1.12 and scanning unit 1.22, a signal dependent on the respective angular position is generated by inductive effects in scanning unit 1.22. For accurate measurement of angular positions, it is important that the signal amplitudes reach a sufficient magnitude. The level of the signal amplitudes is dependent, inter alia, on scanning distance z. In order to prevent changes in scanning distance z, even as little as fractions of a millimeter, for example when the assembly is exposed to temperature fluctuations and/or vibrations, outer wall of housing 1.21 and first inner wall 3.11 are configured accordingly.

Figure 5:
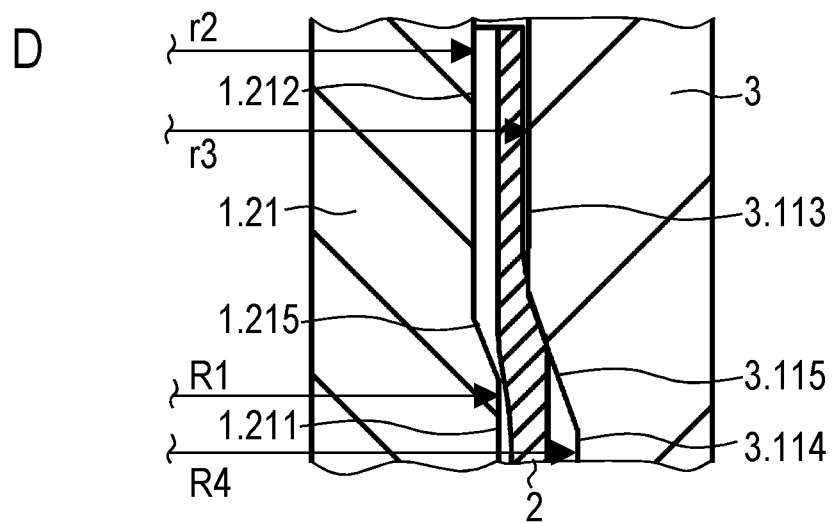
FIG. 5 is a view showing a detail of the cross-sectional view of FIG. 4.

FIG. 5 shows a detail view D (FIG. 4) of housing 1.21 and body 3. Accordingly, the tolerance ring 2 surrounding housing 1.21 is so positioned within opening 3.1 that it is disposed radially between first section 1.211 and fourth section 3.114. Also, tolerance ring 2 is disposed radially between second section 1.212 and third section 3.113. Due to the radially compressed corrugations 2.1, tolerance ring 2 is radially clamped. Housing 1.21 is configured such that a first conical surface 1.215 is present between first section 1.211 and second section 1.212. Furthermore, body 3 is designed such that first inner wall 3.11 has a second conical surface 3.115 between third section 3.113 and fourth section 3.114. Tolerance ring 2 is clamped in particular between first conical surface 1.215 and second conical surface 3.115. With this design, the holding forces are increased, thereby effectively preventing first component group 1.1 of rotary encoder 1 from being significantly displaced relative to second component group 1.2 as a result of temperature fluctuations or temperature differences in the components of the assembly. It is thus also possible to ensure a constant scanning distance z.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An assembly comprising:
   a rotary encoder comprising a shaft to which a scale element is non-rotatably fixed, and a housing accommodating a scanning unit which is non-rotatably connected to the housing, wherein the shaft is disposed such that the shaft is rotatable relative to the housing about an axis, wherein the scale element is scannable by the scanning unit, and wherein the housing has an outer wall which has a first distance from the axis in a first section, and has a second distance from the axis in a second section, the first distance being greater than the second distance;
   a tolerance ring; and
   a body accommodating the rotary encoder and the tolerance ring, the body having an opening that is:
      bounded radially with respect to the axis by a first inner wall, the first inner wall having a third distance from the axis in a third section, and having a fourth distance from the axis in a fourth section, the fourth distance being greater than the third distance, and
      bounded by a second inner wall which forms an axial stop for the housing with respect to the axis, the fourth section being disposed in an axial direction between the second inner wall and the third section,
   wherein the tolerance ring surrounds the housing and is positioned within the opening such that the tolerance ring is disposed radially between the first section and the fourth section and between the second section and the third section, and is radially clamped.

2. The assembly as recited in claim 1, wherein the second inner wall forms an axial stop for the tolerance ring.

3. The assembly as recited in claim 1, wherein the housing has a first conical surface between the first section and the second section.

4. The assembly as recited in claim 1, wherein the first inner wall has a second conical surface between the third section and the fourth section.

5. The assembly as recited in claim 1, wherein the housing has a circumferential outer wall.

6. The assembly as recited in claim 1, wherein the first inner wall has a circumferential inner contour.

7. The assembly as recited in claim 1, wherein the rotary encoder is configured as a bearingless rotary encoder.

8. The assembly as recited in claim 1, wherein the housing has a first conical surface between the first section and the second section, wherein the first inner wall has a second conical surface between the third section and the fourth section, and wherein the tolerance ring is clamped between the first and second conical surfaces.

9. The assembly as recited in claim 1, wherein the first inner wall is an inner wall of the body, wherein the tolerance ring extends along the outer wall of the housing at least partially along the first and second sections, and extends along the inner wall of the body at least partially along the third and fourth sections, and is clamped between the first section of the outer wall of the housing and the third section of the inner wall of the body.

\* \* \* \* \*